United States Patent [19]

Sigel

[11] Patent Number: 5,054,187
[45] Date of Patent: Oct. 8, 1991

[54] METHOD AND MEANS FOR REMOTE-CONTROLLED SHEATHING INSTALLATION WHEN RENOVATING PIPELINES

[75] Inventor: Alwin Sigel, Schlatt, Switzerland

[73] Assignee: Sika Robotics AG, Grunginen, Switzerland

[21] Appl. No.: 368,352

[22] PCT Filed: Nov. 26, 1987

[86] PCT No.: PCT/CH87/00160

§ 371 Date: Jul. 13, 1989

§ 102(e) Date: Jul. 13, 1989

[87] PCT Pub. No.: WO89/03003

PCT Pub. Date: Apr. 6, 1989

[30] Foreign Application Priority Data

Sep. 30, 1987 [CH] Switzerland ............... 3808/87

[51] Int. Cl.⁵ ............................................ B23P 17/02
[52] U.S. Cl. ........................................ 29/507; 29/234
[58] Field of Search ............ 29/234, 33 T, 558, 421 R, 29/401 R, 402, 523, 507; 138/97, 98; 156/94; 409/143, 190; 51/241 R, 245; 125/78, 77; 166/55

[56] References Cited

U.S. PATENT DOCUMENTS 2,393,587 1/1946 Bugg et al. ..................... 269/49
4,069,573 1/1978 Rogers et al. ............... 29/890.031
4,197,908 4/1980 Davis et al. .
4,442,891 4/1984 Wood .
4,577,388 3/1986 Wood .
4,630,676 12/1986 Long .
4,648,454 3/1987 Yarnell .
4,657,450 4/1987 Forner et al. .
4,701,988 10/1987 Wood .

FOREIGN PATENT DOCUMENTS 3446055 6/1986 Fed. Rep. of Germany .
7618806 10/1980 Switzerland .
698726 12/1979 U.S.S.R. .
854610 8/1981 U.S.S.R. .

Primary Examiner—Robert C. Watson
Attorney, Agent, or Firm—Wegner, Cantor, Mueller & Player

[57] ABSTRACT

This invention is a new method and at the same time a new piece of equipment for the renovation of damaged pipelines in which formation of fragments has come about or the pipelines have partly been completely destroyed. The machine can be fitted to a channel renovation robot or to a conventional luge and can be remote controlled with television support. With the machine, which has a simple locking mechanism (4), a metal sheathing (11) is inserted into the interior of the pipe. The sheathing is ejected there in order to repair a damaged point or a missing piece of pipe, whereupon a sealing mass is pressed onto the outside through holes in the sheathing.

10 Claims, 2 Drawing Sheets

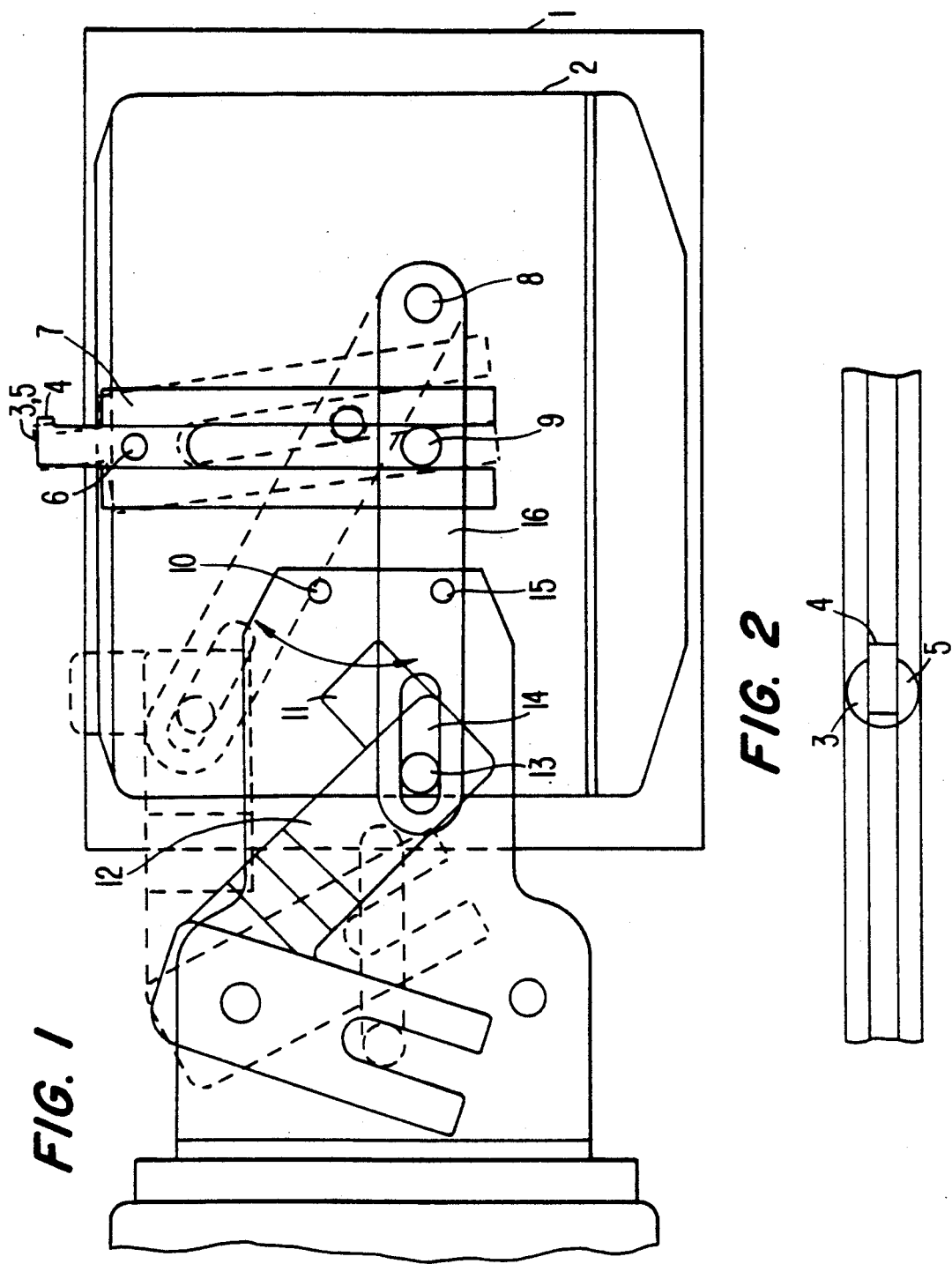

METHOD AND MEANS FOR REMOTE-CONTROLLED SHEATHING INSTALLATION WHEN RENOVATING PIPELINES

This invention is to do with a new method and a new kind of equipment for the remote-controlled installation of sheathing for the renovation of pipelines.

PROBLEM

The problem which has been in existence up to now and which can be solved with this invention is the renovation of damaged pipelines with formation of fragments, if the diameter of the pipe is small and the pipe cannot be entered for the purpose of repair. The repair equipment must therefore be able to be inserted into a pipeline of small diameter, be remote-controlled and also have the advantage against the known methods that also severely damaged pipes with formations of fragments can be repaired. The conventional methods (summarized below) only offered an unsatisfactory solution, because it was precisely the washing out which removed the fragments and thus a larger leak formed, which then could no longer be repaired.

STATE OF TECHNOLOGY

The current start of technology means that renovations of slightly damaged pipes are carried out in two steps:
1. Preparation of the renovation
Treatment and cleaning of the damaged parts (drilling, washing, suction etc.)
2. Actual renovation
Application of filling material (plastics, adhesives, products from cement chemistry etc.).
As already mentioned, only slight damage can be repaired with this traditional procedure, but not cases in which fragments or even entire parts of pipes are missing. This invention now promises the long sought for solution.

BRIEF DESCRIPTION OF THE DRAWINGS

FIG. 1 is a side view of the insertion device
FIG. 2 is a top view of the locking mechanism

Figure 3:
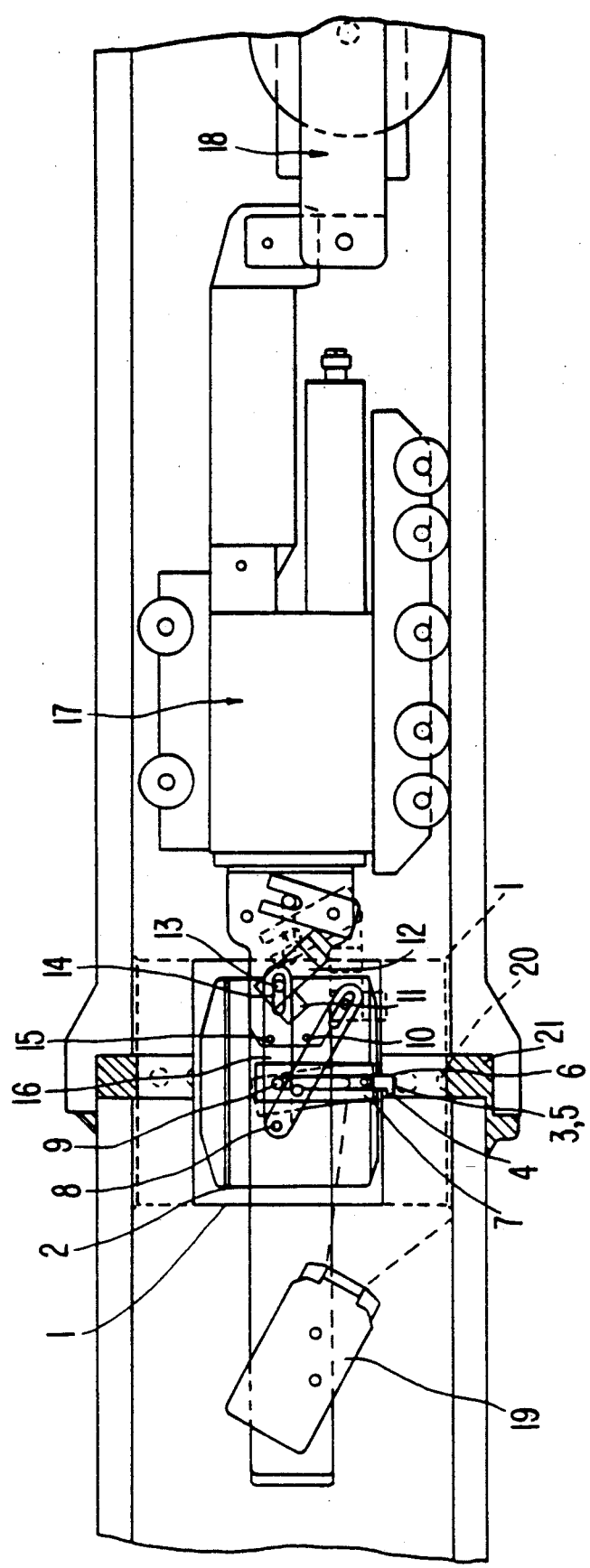
FIG. 3 is a top view of the robot device.

The invention consists of both a method and the accompanying application apparatus. The method basically consists of a corrugated metal sheet being inserted into the damaged pipe with an apparatus by the metal sheet being bent in such a way that it also forms a pipe, only with a smaller diameter. This compressed sheet is now placed in the position in the pipe to be renovated, which has broken, and in which the pipe fragments have possibly already been washed away. Here the pressure is released with which the sheet has been pushed together, whereupon it opens like a spring and forms a pipe with a larger diameter. This sheet is then prevented from opening further by the existing pipe and thus forms the sheathing of the defective pipe at the point of damage. The sealing mass is now pressed through the holes in the metal sheet and fills the space between the earth and the sheathing. The sheathing, which consists of the bent metal sheet, can now be left in the pipe without any difficulties, because the metal chosen is completely rustproof. For this reason, the trade speaks in such cases of a lost sheathing.

In extreme cases, in which whole parts of a pipe have been washed away, more than one metal sheathing can be inserted, which then overlap like roof slates and can thus form a complete pipe.

In order to use this method, an application apparatus is necessary, with the help of which the metal sheet is firstly inserted into the pipe and then put into the correct position.

This apparatus is thus for insertion, positioning and application of the metal sheathing. It consists of a casing 2 (FIG. 1) and a mechanism to hold the sheet. The casing has two pins 3 and 5 on top (FIG. 2) with a semi-circular cross-section, which are a part of the locking mechanism. The application apparatus is attached by means of the holes 15 and 10 to a channel renovation robot, already patented by the same inventor—but can also be used in combination with conventional luges or operated by hand. For control and supervision purposes, extension arms can be fixed to the front of the application apparatus (in FIG. 1 on the right) and a television camera is then fitted to them. This camera looks into the opposite direction, which means that the metal sheathing wound around it becomes visible. The latter is fitted with holes, which are used later for the pressing of the sealing mass. It is through precisely these holes that we can see with the help of the camera whether the damaged part of the pipe has been reached and thus have the possibility to stop at the correct place and eject the metal sheathing Thus, the sheathing consists of a metal sheet 1 (FIG. 1), which is wound around the application apparatus. This flexible sheet has at least one hole at each end, so that it can be placed over the pin 3, 4, 5, which is on the back of the application apparatus. Independent re-coiling, which the swelling sheet aims at, is prevented by a small bar 4 which can be removed from the pin. In order to facilitate the bending of the metal sheet, it is pre-bent to start with and put into a fixed curvature. Attention should be paid to the fact that this curvature is not too strong, so that the sheathing, once it is inside the pipe, still has the necessary tension and can push against the outside of the existing pipe. Thus, strength must still be used in order to bring the sheet down to such a small radius and to coil it around the application apparatus. With a pipe diameter of about 200 mm, the diameter of the sheathing for insertion into the inside of the pipe is reduced to about 160 mm. After the ejection, the diameter of the sheathing increases again due to the tension, and it sticks to the place of ejection in the damaged pipe. The ejection of the sheathing is released by the bar (FIG. 2) in the pin 3, 4, 5 on the back of the application apparatus being pulled back again, through which the sheet, which had been placed over this pin at both ends by its holes, is able to uncoil again through its own spring energy and release itself from the application apparatus. The work material hastelloy, a nickel alloy, was used for the production of the sheathing. The use of this work material for pipe renovation is new. Up to now, it has been used for example for flue gas cleaning plants due to its high acid-resistance. This hastelloy is preferred to chrome steel, PVC or polyaethylene due to the special material features.

Hastelloy has practically the same coefficient of expansion as concrete and is highly superior to the materials mentioned as regards tension, space resistance, pressure-resistance, coefficient of temperature expansion, cleaning resistance ("resistance to cleaning jets"), acid-resistance and non-decaying. The service life of hastelloy is accordingly about 20 to 25 years. (As a comparison: the service life of chrome steel is about 5 years).

As regards the mechanism in the inside of the application apparatus, the following must be said: its purpose is the pushing forwards and backwards of the bar 4 (FIG. 1 and 2) in the pin 3 and 5. For this, a pivotable lever 16 is positioned on the axis 8 in such a way that the cam 9 on it can make a circular movement. This lever 16 is put into motion by a T-shaped control head 12, which for its part is controlled by the renovating machine mentioned above, which has already been patented.

The higher end 11 of the control head 12 is to eject the sheathing when opening the locking mechanism. That is to say that the T-shaped piece 12 must go up when releasing the locking, in order to be able to pull in the bar 4. Thus the T-shaped piece 12 with its higher end 11 pushes the two end of the coiled sheet upwards over the pin 3, 4, 5 so that it can jump off. From T-shaped piece 12, the motion is transmitted by means of the connection point 13 to the lever arm 16. The T-shaped piece 12 is fastened to the lever arm 16 at the connection point 13 i such a way that it is freely movable within the recess 14, which permits a circular movement of the lever arm 16. The force transmission is then carried out with cam 9 from the lever arm 16 onto the tuning fork-shaped locking mechanism 7, whereby the bar 4 (cf. also FIG. 2) opens or closes the locking through the movement of the "tuning". The two conditions of the locking mechanism are shown in FIG. 1:

The thick lines show the closed state and the dotted lines the open state. The tuning fork-shaped locking part is merely attached pivoted on the casing at point 6 and is open at the bottom. The simple mode of construction with the "tuning fork" which is open to the bottom facilitates any replacement of this part of the equipment by it simply being screwed off and pulled upwards.

The application apparatus described here is, as already mentioned, either attached to the patented channel renovation robot (or a conventional luge) and opened or closed by the latter by the robot pushing the T-shaped piece 12 up or down. In FIG. 1, parts of the robot mentioned are visible on the left-hand side of the application apparatus described.

As shown in FIG. 3, the robot 17 having a torque bar 18 is inserted into the pipe to be repaired with the application apparatus fitted and is moved to the defective point by remote control. A television camera 19 is provided to allow the renovating operation to be viewed. In a further step, the sealing mass, e.g. Epoxit, is applied after the ejection of the metal sheet (the ejected metal sheet 1 is shown in dotted lines in FIG. 3). This takes place by the sealing mass being pressed through holes 20 in the sheathing and expanding between the sheathing and the surroundings, as is shown at 21. In this way, permanent sealing is obtained.

This invention has thus made it possible to solve and old, almost insoluble problem. Whereas up to now, the whole pipe had to be dug up with the long ditch in cases of formation of fragments in pipelines, in order to replace it with a new one, it can now be elegantly renovated with the help of this sophisticated invention. In this way, immense costs can also be saved. This is especially the case if, for example, the defective pipe goes under a building, where it cannot be laid open.

I claim:

1. An insertion device for the renovation of nonwalkable pipelines having a diameter too small for a repairman to walk therein, said device comprising:
    a casing;
    a rustproof metal sheet adapted to be bent around said casing to form a pipe for insertion into the pipeline, said metal sheet having at least one hole formed on each of two opposite edges;
    at least one projection projecting from said casing, said at least one projection being adapted to project through said at least one hole on each of the two opposite edges of said sheet to temporarily fix said sheet around said casing;
    at least one retractable locking element extending from each of said at least one projections, said at least one locking element gripping said corresponding holes in said metal sheet to prevent the release of the sheet from the casing when said locking element is extended; and
    an ejection element which ejects said sheet from said casing upon retraction of said at least one locking element, so that said metal sheet attaches itself to the inner surface of said pipeline due to the electricity of said metal sheet.

2. An insertion device as in claim 1, wherein said at least one locking element is coupled to a first lever which is pivotable about an axis fixed to said casing, said first lever being coupled to a transmission member which is movable via an arm upon which said ejection element is carried.

3. An insertion device as in claim 2, wherein said transmission member is a second lever pivotable about a second axis fixed to said casing, said second lever being coupled to said first lever via a pin/slot combination.

4. An insertion device as in claim 3, wherein said first lever is a two-armed lever which carries said at least one locking element on one arm thereof, the other arm of which is forked and accommodates a pin fitted on said second lever between the two prongs of the fork.

5. An insertion device as in claims 2 or 3, wherein said arm is a third pivoting lever coupled to said second lever via a second pin/slot combination.

6. An insertion device as in claim 2, further comprising a pipeline renovating vehicle adapted to be coupled to said casing, said vehicle having a movable torque bar which can be coupled to said arm.

7. An insertion device as in claim 1, further comprising a television camera allowing the operation of the device to be viewed.

8. A method for renovating nonwalkable pipelines having a diameter too small for a repairman to walk therein, said method including the steps of:
    temporarily fixing a rustproof metal sheet around a casing to form a pipe for insertion into the pipeline by fitting at least one hole formed on each of two opposite edges of said sheet onto at least one projection projecting from said casing;
    causing at least one retractable locking element disposed on each of said at least one projections to extend so as to grip said corresponding holes in said metal sheet to prevent the release of the sheet from the casing;
    removing said casing within the pipeline via remote control to the point requiring renovation; and
    retracting said at least one locking element and ejecting said sheet from said casing so that said metal sheet attaches itself to the inner surface of said pipeline due to the electricity of said metal sheet.

9. A method as in claim 7, further comprising the step of injecting a sealant between said metal sheet and said pipeline.

10. A method as in claim 7, further comprising the step of pre-bonding said metal sheet to a desired curvature to facilitate installation of the metal sheet on said casing.

* * * * *